(12) United States Patent
Yamanaka et al.

(10) Patent No.: US 6,345,218 B1
(45) Date of Patent: Feb. 5, 2002

(54) VEHICLE STEERING CONTROL SYSTEM BASED ON VEHICLE BODY SIDE SLIP ANGLE

(75) Inventors: Sachiko Yamanaka; Yasuji Shibahata; Atsushi Mori, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/500,743

(22) Filed: Feb. 9, 2000

(30) Foreign Application Priority Data

Apr. 6, 1999 (JP) ............................................ 11-098359

(51) Int. Cl.⁷ ................................................ B62D 6/00
(52) U.S. Cl. ............................. 701/41; 180/6.2; 180/204
(58) Field of Search ........................... 701/41; 180/204, 180/6.2, 234, 400

(56) References Cited

U.S. PATENT DOCUMENTS

| | | | |
|---|---|---|---|
| 4,412,594 A | * 11/1983 | Furukawa et al. | 180/140 |
| 4,625,822 A | * 12/1986 | Nakamura et al. | 180/140 |
| 4,767,588 A | * 8/1988 | Ito | 364/424 |
| 5,899,952 A | 5/1999 | Fukada | 701/74 |

FOREIGN PATENT DOCUMENTS

| | | |
|---|---|---|
| JP | 62-83247 | 4/1987 |
| JP | 2-37080 | 2/1990 |

\* cited by examiner

*Primary Examiner*—Yonel Beaulieu
(74) *Attorney, Agent, or Firm*—Carrier, Blackman & Associates, P.C.; Joseph P. Carrier; William D. Blackman

(57) ABSTRACT

In a four wheel steering vehicle, the rear wheels are steered so as to reduce a magnitude of the vehicle body side slip angular speed. Thus, whenever there is a rise in the vehicle body side slip angle which is directed outward with respect to the turning circle of the vehicle at an early stage of turning operation, the rear wheels are steered in opposite sense to the front wheel steering angle. Therefore, the vehicle body side slip angle is at least partly canceled, and this in turn increases the yaw moment and produces a sharp heading response. As the vehicle continues the turning operation, the rear wheels are steered in the same phase as the front wheels, thereby offsetting the tendency of the vehicle to go into a spin. When the vehicle is turning at a steady rate without incurring any change in the vehicle body side slip angle, the rear wheels are not steered, and the vehicle essentially behaves as if it were a front wheel steering vehicle.

6 Claims, 5 Drawing Sheets

VEHICLE STEERING CONTROL SYSTEM BASED ON VEHICLE BODY SIDE SLIP ANGLE

TECHNICAL FIELD

The present invention relates to a vehicle steering control system a equipped with an auxiliary steering device for optimally assisting the steering of rear wheels of a vehicle according to each given condition, and in particular to such a vehicle steering control system which is applicable to four wheel steering vehicles.

BACKGROUND OF THE INVENTION

In a front wheel steering (2WS: two wheel steering) vehicle in which only the front wheels are steered, a vehicle body side slip angle is necessarily produced for the rear wheel to have a side slip angle during a cornering maneuver. This in turn requires the vehicle body to turn around its gravitational center under a yawing moment. This however is detrimental in achieving a favorable turning response of the vehicle, and also prevents a favorable settling property of the vehicle following a yaw motion. Four wheel steering (4WS) vehicles were proposed to overcome such problems associated with more conventional front wheel steering vehicles. In a four wheel steering vehicle, the rear wheels, as well as the front wheels, are steered so as to positively control the side slip angle of the rear wheels. The four wheel steering systems have since been incorporated in a large number of commercially available vehicles.

As a control method for a four wheel steering vehicle, it was proposed in Japanese patent laid open publication No. 02-37080 to control the rear wheel steering angle by using a differential element based on the rear wheel side slip angle. However, because the side slip angle of the rear wheels while making a turn is necessarily directed inward (positive), the previous proposal may improve the stability of the vehicle as indicated in FIGS. 4 and 5 of this prior patent publication, but very little improvement was made in the vehicle response in terms of the heading response of the vehicle at an early stage of steering operation. This also translates into the fact that the property of such a four wheel steering vehicle in a high speed range is not significantly different from that of a front wheel steering vehicle.

BRIEF SUMMARY OF THE INVENTION

In view of such problems of the prior art, a primary object of the present invention is to provide a vehicle steering control system which can achieve a favorable heading response at an early stage of steering operation while ensuring a high level of stability throughout an entire turning maneuver.

A second object of the present invention is to provide a vehicle steering control system which can ensure a favorable turning behavior while relying on a highly simple control logic so that a stable operation may be ensured at all times.

According to the present invention, such objects can be accomplished by providing a vehicle steering control system, comprising: a rear wheel steering device; a vehicle body side slip angular speed detecting unit for obtaining a vehicle body side slip angular speed at a point ahead of a rear axle of a vehicle body; and a steering control unit for actuating the rear wheel steering device so as to reduce a magnitude of the vehicle body side slip angular speed obtained by the vehicle body side slip angular speed detecting unit.

According to this arrangement, when there is a rise in the vehicle body side slip angle which is directed outward with respect to the turning circle of the vehicle at an early stage of turning operation, or when the outwardly directed vehicle body side slip angle sharply increases, the auxiliary steering device produces an auxiliary rear wheel steering angle which is opposite in sense to the front wheel steering angle. Thereby, the vehicle body side slip angle is at least partly canceled, and this in turn increases the yaw moment and produces a sharp heading response. As the vehicle continues the turning operation, the increased yaw moment eventually produces a tendency to spin the vehicle. This translates into a vehicle body side slip angular velocity which is directed inward with respect to the tangential line of the turning circle. Therefore, the auxiliary steering device steers the rear wheels in the same phase as the front wheels, thereby offsetting the tendency of the vehicle to go into a spin. When the vehicle is turning at a steady rate without incurring any change in the vehicle body side slip angle, the auxiliary steering device does not steer the rear wheels, and the vehicle essentially behaves as if it were a front wheel steering vehicle.

In particular, by increasing the gain for determining the amount of auxiliary steering angle with respect to the vehicle body side slip angular speed with the increase in the vehicle speed, it is possible to control the heading response and improve the stability in a high speed range at the same time. In a low to medium speed range in which the influences of inertia are relatively small, there is no opposite-phase auxiliary steering, and a high level of stability is ensured.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
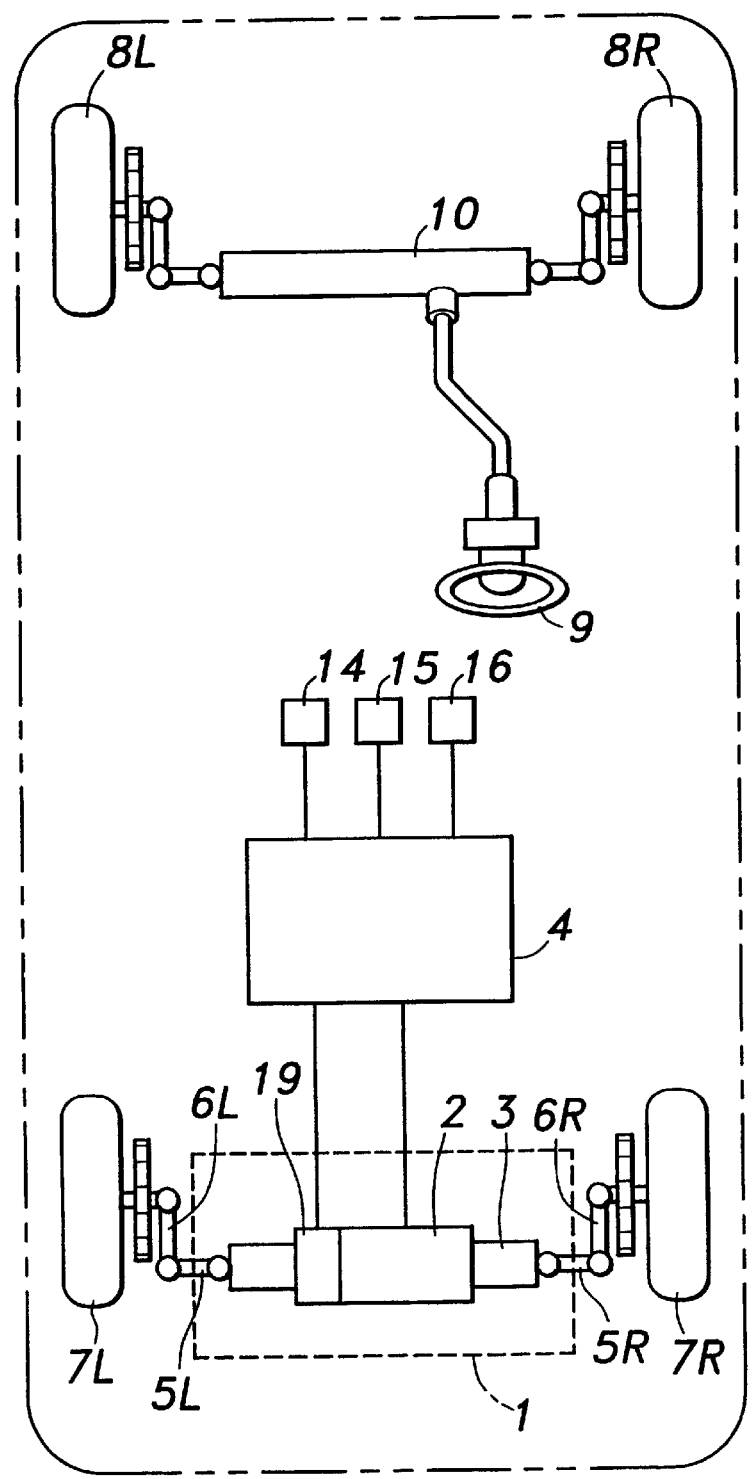
FIG. 1 is a schematic diagram showing the overall arrangement of a vehicle steering system embodying the present invention.

FIG. 1 schematically illustrates the overall view of a vehicle steering system incorporated with an auxiliary steering device for rear wheels embodying the present invention This rear wheel auxiliary steering device 1 comprises an electric motor 2 which is coaxially arranged on a steering shaft 3. The rotational torque produced from the electric motor 2 according a drive current supplied from a control unit 4 is converted into an auxiliary steering force consisting of an axial force acting on the laterally extending steering shaft 3 via a rotational torque/axial force converting mechanism, for instance, consisting of a per se known ball-screw mechanism.

The two ends of the steering shaft 3 are connected to rear knuckle arms 6R and 6L via steering link members 5R and 5L, respectively, so that the lateral translational displacement of the steering shaft 3 is converted into the steering angle of the rear wheels 7R and 7L. The front wheels 8R and 8L are actuated in a more conventional manner. More specifically, a steering torque applied to a steering wheel 9 is converted into an axial force of a rack shaft of a front wheel steering device 10 so that the steering angle of the front wheels 8R and 8L is produced in proportion to the turning angle of the steering angle.

Figure 2:
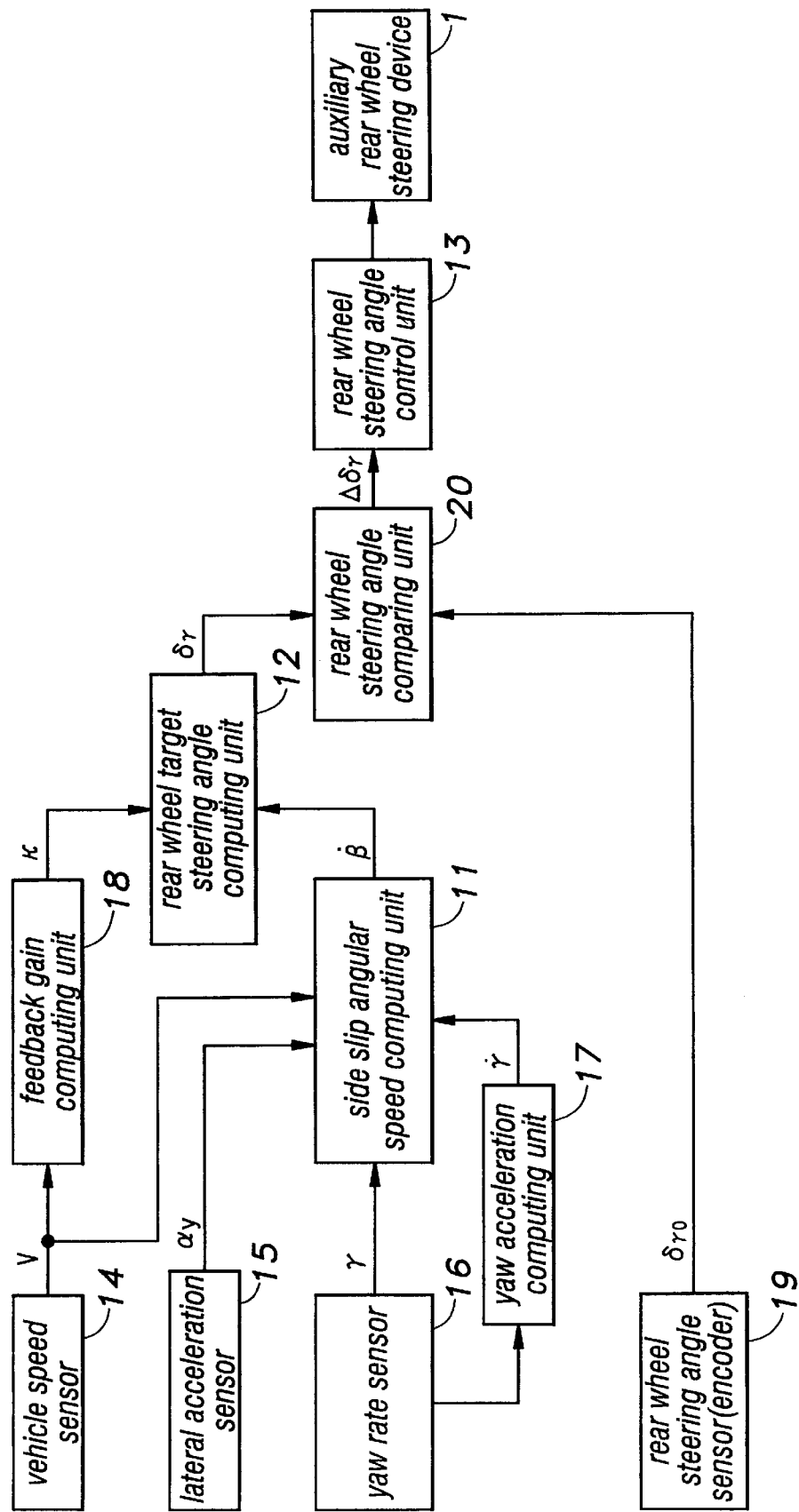
FIG. 2 is a block diagram of the control unit for the auxiliary rear wheel steering system shown in FIG. 1.

FIG. 2 shows the functional arrangement of the control unit 4 which essentially consists of a CPU which is preprogrammed. The control unit 4 for this auxiliary rear wheel steering device 1 comprises a side slip angular speed computing unit 11 for computing a vehicle body side slip angle at a certain point on the vehicle body located ahead of the rear axle, a rear wheel target steering angle computing unit 12 for determining the steering angle of the rear wheels 7R and 7L according to the side slip angular speed supplied from the side slip angular speed computing unit 11, and a rear wheel steering angle control unit 13 for controlling the operation of the auxiliary rear wheel steering device 1 according to the steering angle value obtained by the rear wheel target steering angle computing unit 12. The rear wheel auxiliary steering device 1 steers the rear wheels 7R and 7L accordingly.

The vehicle body side slip angular speed $\beta_x$ at a point of the vehicle body displaced by a distance x from the front axle may be computed from the following equation $$\beta_x = \gamma + [(d\gamma/dt)(x-a)/V] - (\alpha_y/V)$$

where a is the distance between the front axle and the gravitational center of the vehicle body, $\gamma$ is the yaw rate, and $\alpha_y$ is the lateral acceleration. In this embodiment, the side slip angular speed computing unit 11 receives the necessary data from a vehicle speed sensor 14, a lateral acceleration sensor 15, a yaw rate sensor 16, and a yaw acceleration computing unit 17. The body side slip angle can be determined not only from the above equation but also from any other estimation or measurement methods. See U.S. patent application Ser. No. 09/192,894 filed Nov. 17, 1998 which was assigned to the common assignee, and is now U.S. Pat. No. 6,233,513. The content of this earlier application is incorporated in this application by reference.

Figure 3:
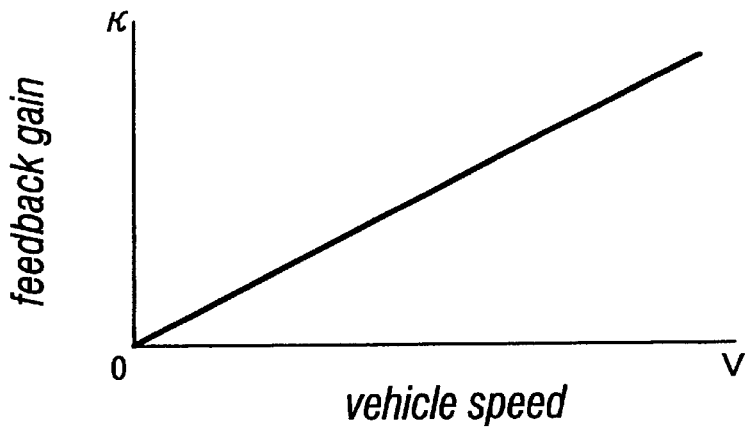
FIG. 3 is a graph showing a relationship between the feedback gain and the vehicle speed.

A feedback gain computing unit 18 determines a feedback gain k for the vehicle body side slip angular speed $\beta_x$ obtained by the side slip angular speed computing unit 11, according to the output from the vehicle speed sensor 14. The feedback gain k may, for instance, be linearly proportional to the vehicle speed V as shown in FIG. 3.

The target rear wheel steering angle $\delta_r$ is determined from the following equation which depends on the vehicle body side slip angular speed $\beta_x$ obtained by the side slip angular speed computing unit 11 and the feedback gain k obtained by the feedback gain computing unit 18.

$$\delta_r = k\beta_x$$

The target rear wheel steering angle $\delta_r$ is compared with the output $\delta_{r0}$ of a rear wheel steering angle sensor 19 consisting of a rotary encoder provided in the auxiliary rear wheel steering device 1 by a rear wheel steering angle comparing unit 20, and the actually required increment of the rear wheel steering angle $\Delta\delta_r$ is obtained.

$$\delta\Delta_r = \Delta_r - \Delta_{r0}$$

This increment is then converted into the drive current of the electric motor by a rear wheel steering angle control unit 13, and the electric motor 2 of the auxiliary rear wheel steering device 1 steers the rear wheels 7R and 7L accordingly.

Figure 4:
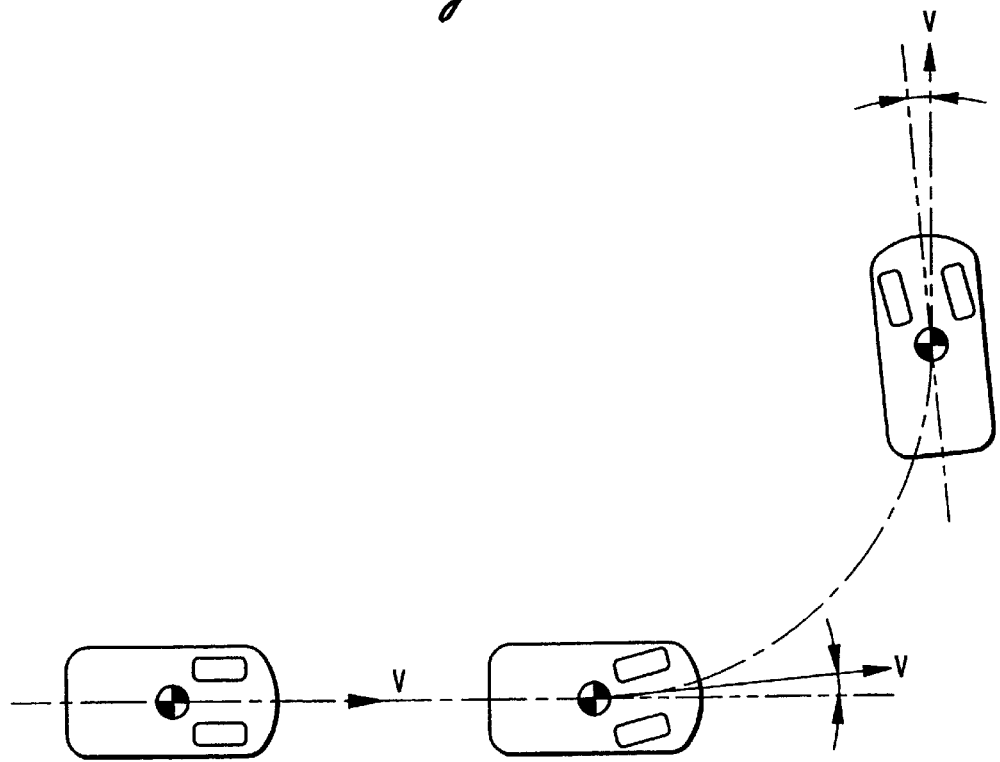
FIG. 4 is a diagram showing the behavior of a vehicle making a turn.

Referring to FIG. 4, in the case of a front wheel steering vehicle, when the front wheels are steered at a relatively high speed, the inertia of the vehicle body produces a tendency for the vehicle to continue to travel straight ahead during an early part of the cornering operation. It produces a vehicle body side slip angle which is directed outward with respect to the tangential line of the turning circle. When the vehicle is turning a corner at a constant turning radius, the cornering forces of the front and rear wheels balance out with the centrifugal force acting on the vehicle body. However, because the vehicle body is subjected to a yawing moment, the resulting vehicle body side slip angle is directed inward with respect to the tangential line of the turning circle.

According to the present invention, as the vehicle body side slip angle which is directed outward (negative) rises sharply at an early phase of cornering operation, the rear wheels are steered in an opposite phase so as to control or offset the change in the vehicle body side slip angle. This promotes the sharp increase of the yaw rate, and improves the heading response of the vehicle. As the vehicle continues to turn the curve with the rear wheels steered in the opposite phase, the rear wheel side slip angle diminishes. This in turn causes an increase in the inwardly directed vehicle body side slip angle so as to produce a cornering force that is required to balance out with the centrifugal force. According to the present invention, the rear wheels are steered so as to control or offset the vehicle body side slip angle, and the rear wheels are then steered so as to increase the rear wheel side slip angle. In other words, the rear wheels are automatically steered in a same phase relationship, and this stabilizes the vehicle behavior.

When the vehicle is turning at a steady radius of curvature, as there is no change in the vehicle body side slip angle or the vehicle body side slip angular speed is zero, no auxiliary steering action takes place, and the vehicle behaves substantially as a normal front wheel steering vehicle.

Figure 5:
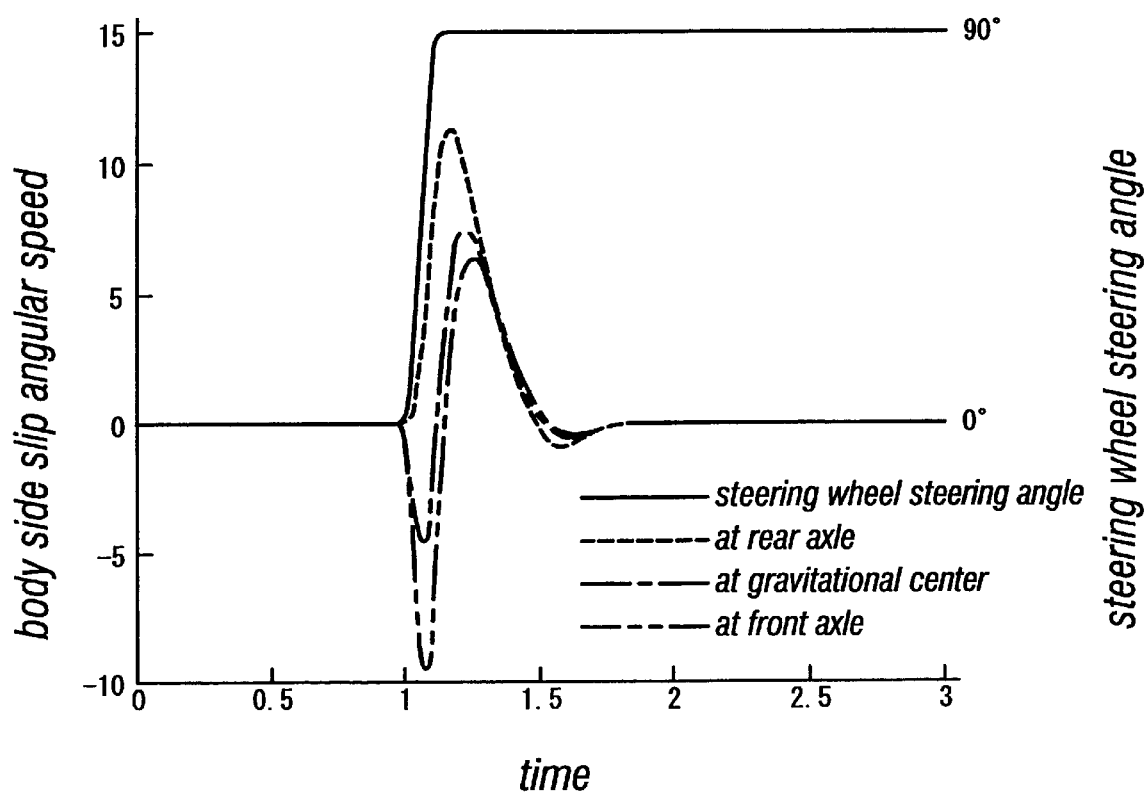
FIG. 5 is a graph showing the vehicle body side slip angular speed at various points on the vehicle body during an early phase of turning operation.
Figure 6A:
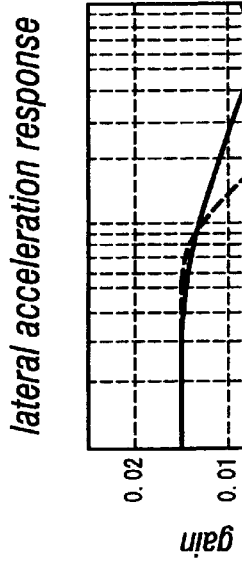
FIGS. 6A–6F is a set of graphs comparing the responses of a 4WS vehicle embodying the present invention with a 2WS vehicle.
Figure 6B:
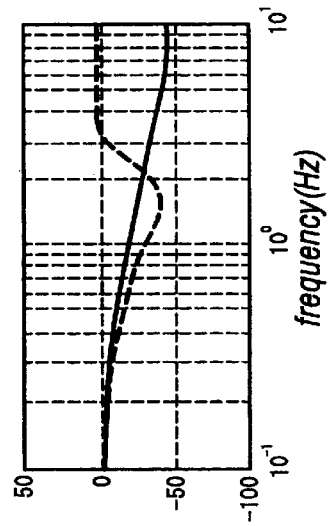
Figure 6C:
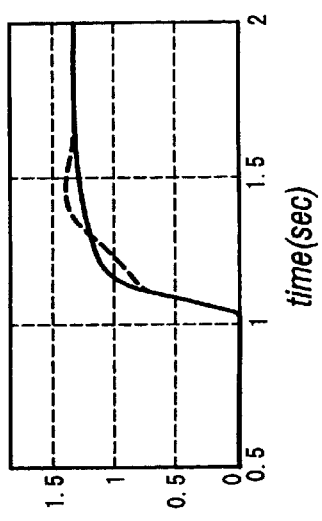
Figure 6D:
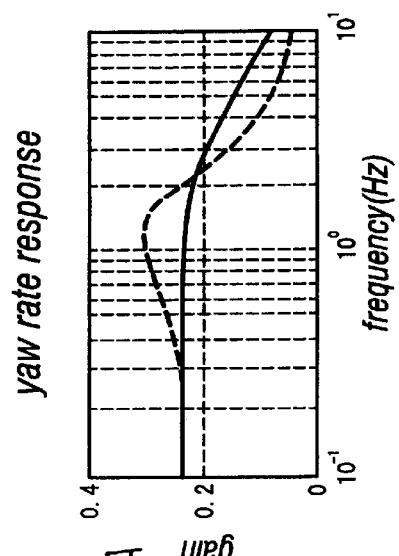
Figure 6E:
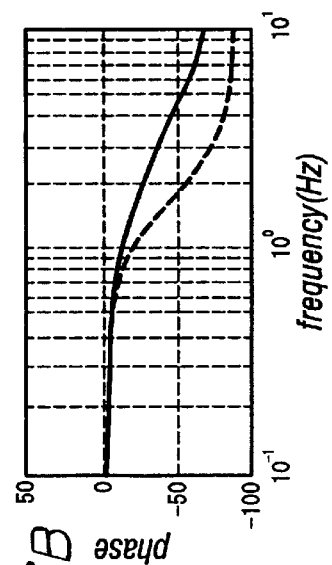
Figure 6F:
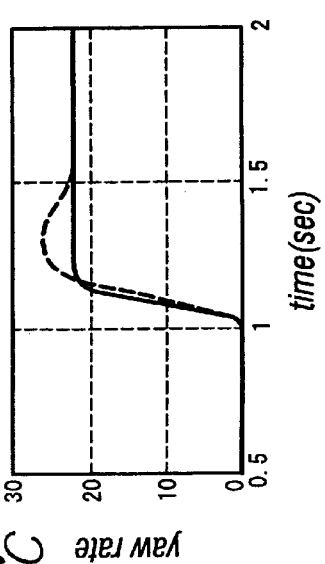

FIG. 5 shows the response of the vehicle body side slip angular speed when the vehicle traveling at 120 km/h is sharply steered by 90 degrees from a straight ahead condition. When the point of measuring the vehicle body side slip angular speed is selected on the rear axle, the vehicle body side slip angular speed initially swings in the positive direction, and then quickly settles to zero. However, as the point of measurement is moved forward from the rear axle, the tendency for the vehicle body side slip angular speed to temporarily move in the negative direction progressively increases. In other words, at an early phase of cornering operation, the more forward the point for detecting the vehicle body side slip angular speed is moved from the rear axle, the greater the gain for the same phase steering of the rear wheels becomes. According to the analyses conducted by the inventors, when the point of measurement is located ahead of the rear axle, the vehicle body side slip angular speed generally swings in the negative direction in response to usually expected sudden steering maneuvers.

FIGS. 6A–6F compare the behavior of a front wheel steering (2WS) vehicle with that of a four wheel (4WS) steering vehicle in which the rear wheel steering angle is controlled according to the vehicle body side slip angular speed on the front axle. In both cases, the vehicle is traveling at 120 km/h. The graphs on the left show the yaw rate responses, and the graphs on the right show the lateral acceleration responses.

The frequency response of the yaw rate of the four wheel steering vehicle according to the present invention has a reduced peak level as compared with that of the front wheel steering vehicle. Furthermore, the four wheel steering vehicle demonstrated a reduced phase delay in a high frequency range. It means that the four wheel steering vehicle is improved in terms of both responsiveness and stability. Furthermore, the four wheel steering vehicle demonstrated a more sharp rise in the yaw rate rises in response to the turning of the steering wheel without incurring any significant overshoot. In other words, the four wheel steering vehicle is improved over the front wheel steering vehicle also in terms of both heading responses and settling characteristics.

In terms of a lateral response frequency response, the four wheel steering vehicle is free from any excessive peaks in the gain and the phase advance, as opposed to the front wheel steering vehicle, and it translates into a higher stability. Additionally, the transient response to the steering input is smoother.

Thus, the four wheel steering vehicle incorporated with the auxiliary rear wheel steering device according to the present invention is improved in both heading response and stability, and this is achieved without changing the handling of the vehicle in a steady state cornering maneuver. As an additional advantage, the auxiliary rear wheel steering device prevents a reduction in the traction of the rear wheels as the vehicle makes a turn while applying traction because the rear wheels are not substantially steered, and are therefore not subjected to any significant load during a steady state turn or toward the end of cornering operation.

Although the present invention has been described in terms of preferred embodiments thereof, it is obvious to a person skilled in the art that various alterations and modifications are possible without departing from the scope of the present invention which is set forth in the appended claims.

What is claimed is:
1. A vehicle steering control system, comprising:
a rear wheel steering device;
a vehicle body side slip angular speed detecting unit for obtaining a vehicle body side slip angular speed at a point ahead of a rear axle of the vehicle body; and
a steering control unit for actuating said rear wheel steering device so as to reduce a magnitude of the vehicle body side slip angular speed obtained by said vehicle body side slip angular speed detecting unit.
2. A vehicle steering control system according to claim 1, wherein said vehicle body side slip angular speed detecting unit obtains the vehicle body side slip angular speed at a point between a gravitational center and a front axle of the vehicle body.
3. A vehicle steering control system according to claim 1, wherein a gain of a rear wheel steering angle determined by said steering control unit with respect to the obtained vehicle body side slip angular speed is increased with an increase in a vehicle traveling speed.
4. A vehicle steering control system according to claim 1, wherein the vehicle body side slip angular speed detecting unit comprises a sensors for detecting a vehicle speed, a lateral acceleration sensor, and a yaw rate sensor, and a computing unit for computing the vehicle body side slip angular speed from outputs of these sensors.
5. A vehicle steering control system according to claim 1, wherein said steering control unit actuates said rear wheel steering device to steer rear wheels of the vehicle body in an opposite direction to that of a front wheel steering angle when there is a rise in side slip angle of the vehicle body which is directed outward with respect to a turning circle of the vehicle body at an early stage of a turning operation.
6. A vehicle steering control system according to claim 5, wherein said steering control unit actuates said rear wheel steering device to steer rear wheels in the same direction as that of the front wheel steering angle at a later stage of said turning operation.

\* \* \* \* \*

UNITED STATES PATENT AND TRADEMARK OFFICE
CERTIFICATE OF CORRECTION

PATENT NO. : 6,345,218 B1
DATED : February 5, 2002
INVENTOR(S) : Sachiko Yamanaka, Yasuji Shibahata and Atsushi Mori It is certified that error appears in the above-identified patent and that said Letters Patent is hereby corrected as shown below:

Column 1,
Line between 7 and 8, change "system a" to -- system --.

Column 2,
Line 50, change "is" to -- are --.
Line 58, after "invention" insert a period.

Column 3,
Line 11, change "steering angle" to -- steering wheel --.
Line 67, change "$\delta\Delta_r = \Delta_r - \Delta_{r0}$" to -- $\Delta\delta_r = \delta_r - \delta_{r0}$ --.

Column 6,
Line 22, change "sensors" to -- sensor --.

Signed and Sealed this

Third Day of September, 2002

Attest:

JAMES E. ROGAN
Attesting Officer       Director of the United States Patent and Trademark Office